US006607017B2

(12) United States Patent
Kulikov et al.
(10) Patent No.: US 6,607,017 B2
(45) Date of Patent: Aug. 19, 2003

(54) ONE PASS COMBINATION OF TRADITIONAL AND MULTI-AXIS MATERIAL CARVING MACHINE

(76) Inventors: Konstantin N. Kulikov, 2011 Viking Dr. NW., #38, Rochester, MN (US) 55901; Karim Esmailzadeh, 3905 Viola Rd. NE. P.O. Box 9246, Rochester, MN (US) 55906-9246

(*) Notice: Subject to any disclaimer, the term of this patent is extended or adjusted under 35 U.S.C. 154(b) by 0 days.

(21) Appl. No.: 09/867,037

(22) Filed: May 29, 2001

(65) Prior Publication Data

US 2002/0179183 A1 Dec. 5, 2002

(51) Int. Cl.[7] ........................ B27L 11/00; B23Q 15/00; B27C 1/00

(52) U.S. Cl. .................... 144/375; 144/3.1; 144/114.1; 144/116; 144/117.1; 144/356; 144/373; 144/382; 409/108; 409/216

(58) Field of Search ........................ 144/1.1, 3.1, 48.2, 144/48.3, 114.1, 116, 117.1, 134.1, 356–357, 373, 375, 382; 409/108, 138, 139, 140, 201, 211, 216

(56) References Cited

U.S. PATENT DOCUMENTS

| | | | | |
|---|---|---|---|---|
| 2,214,450 A | | 9/1940 | Boehle | |
| 3,882,911 A | | 5/1975 | Pachmayr et al. | |
| 3,891,015 A | | 6/1975 | Calcagno | |
| 4,220,492 A | * | 9/1980 | Lenhardt | |
| 5,345,983 A | * | 9/1994 | de Abreu | 144/3.1 |
| 5,492,057 A | | 2/1996 | Bornhors, Jr. | |
| 5,663,802 A | | 9/1997 | Beckett et al. | |
| 5,664,308 A | * | 9/1997 | Deitert | 489/216 |

* cited by examiner

*Primary Examiner*—W. Donald Bray
(74) *Attorney, Agent, or Firm*—Gerald E. Helget; Nelson R. Capes; Briggs and Morgan

(57) ABSTRACT

Apparatus and method for carving a uniformly carved portion and a variably carved portion in a workpiece in a single pass. The apparatus consists of a uniform carving head fixed relative to the workpiece and a variable carving head that is movable simultaneously in two directions substantially perpendicular to the motion of the workpiece. A control system, which may include a programmable computer, controls the motion of the variable carving head.

30 Claims, 22 Drawing Sheets

ONE PASS COMBINATION OF TRADITIONAL AND MULTI-AXIS MATERIAL CARVING MACHINE

BACKGROUND OF THE INVENTION

The present invention relates to a carving machine for flat material, such as wood mouldings, that combines in one machine a traditional carving head and a multi-axis carving head, so that the workpiece can be carved by both heads in one pass, to produce a variety of interesting and intricate designs in the workpiece.

Flat material, such as wooden mouldings, can traditionally be carved automatically by a machine that feeds the workpiece under a spinning carving head that has affixed to it one or more blades. As the spinning blades contact the workpiece, a straight, uniform channel is produced in the workpiece. In the traditional carving machine, the carving head is fixed in place and does not change position either vertically or horizontally with respect to the workpiece.

In some limited applications, it is known to move the carving head vertically with respect to the workpiece, in order to either maintain an even depth of cut when the surface of the workpiece varies (as in U.S. Pat. No. 3,891,015) or to produce ornamental patterns by vibrating the cutter structure and oscillating it orbitally (as in U.S. Pat. No. 3,882,911).

Russian Federation Patent No. RU-2094238, of which one of the present inventors is the inventor, discloses a multi-axis carving machine that can, under program control, move a cutting head parallel to and perpendicular to the surface of the workpiece as the workpiece is moved under the cutting head.

However, the inventors do not know of any carving machine that combines the traditional flat material carving machine with a multi-axis carving machine to produce both types of carvings in a single pass through the machine.

SUMMARY OF THE INVENTION

Apparatus and method for carving a uniformly carved portion and a variably carved portion in a workpiece in a single pass. The apparatus consists of a uniform carving head fixed relative to the workpiece and a variable carving head that is movable simultaneously in two directions substantially perpendicular to the motion of the workpiece. A control system, which may include a programmable computer, controls the motion of the variable carving head.

A principle object and advantage of the present invention is that it can carve both a uniformly carved portion and a variably carved portion into the workpiece in a single pass.

A second principle object and advantage of the present invention is that it can carve either uniformly or variably or both.

Another principle object and advantage of the present invention is that it may include a control system to control the speed of movement of the workpiece past the carving heads and to control the motion of the variable carving head.

A feature of the invention is that it may include side carving heads to cut the width of the workpiece for the exact size required.

Another feature of the invention is self-adjusting feed rollers which can take variation of the material thickness into account without causing any damage to the workpiece or to the machine.

Another feature of the invention is a self-adjusting hold-down mechanism which can hold the workpiece down on the machine for continuous accurate carving of the workpiece.

BRIEF DESCRIPTION OF THE DRAWINGS

FIGS. *7a–7d* are schematic elevational views of a variety of blades for shaping the edges of a workpiece.

DETAILED DESCRIPTION OF THE PREFERRED EMBODIMENT

Figure 1:
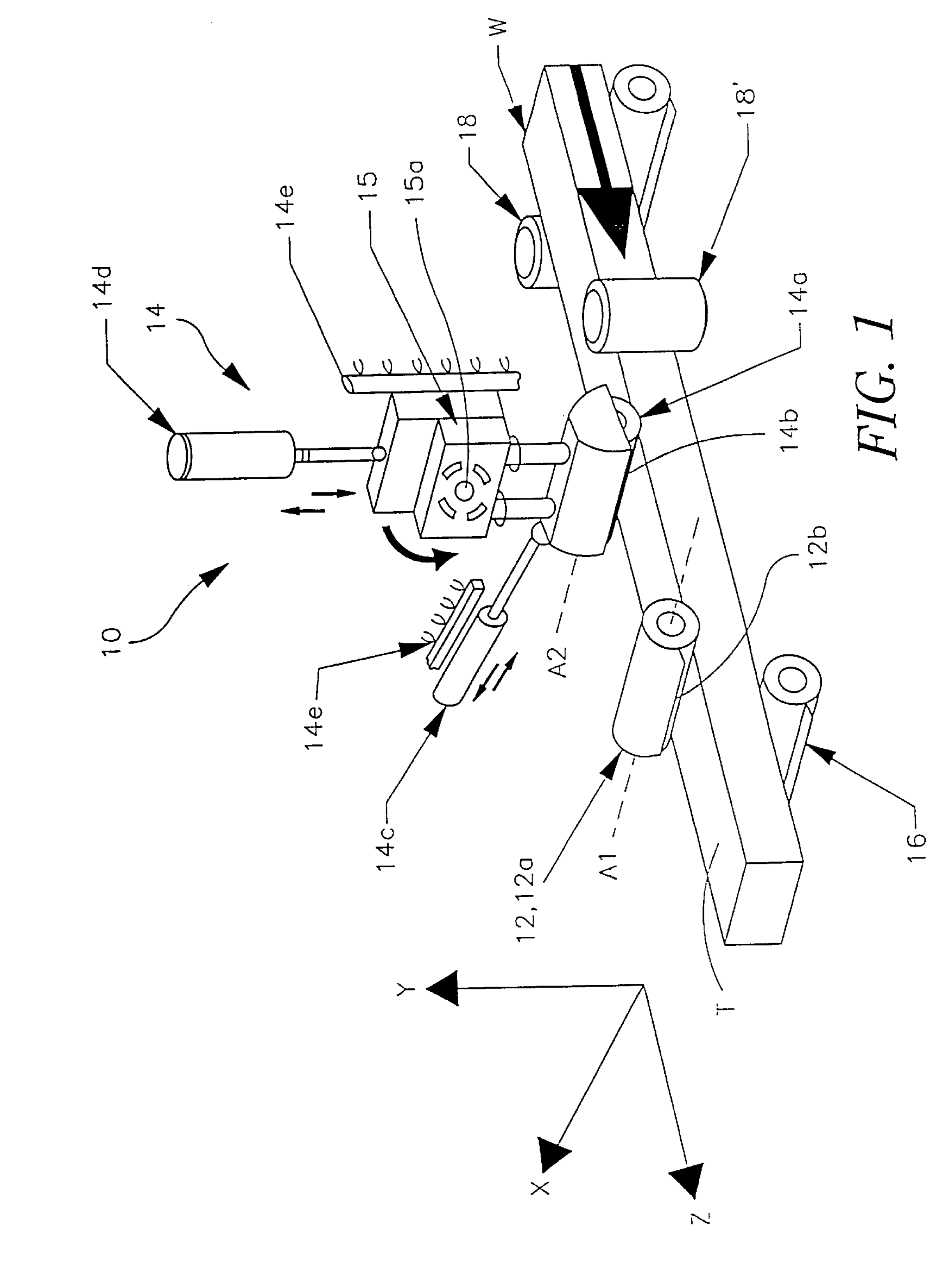
FIG. 1 is a schematic perspective view of the combination machine of the present invention.

The combination traditional and multi-axis flat material carving machine of the present invention is generally shown in the Figures as reference numeral 10.

As initially seen in FIG. 1, the present invention comprises a carving machine 10 for carving a workpiece W. The carving machine 10 further comprises a traditional carving head 12 and a multi-axis carving head 14.

The traditional carving head 12 further comprises a substantially cylindrical member 12*a* with an axis A1 substantially parallel to the top surface T of the workpiece W. Affixed to the cylindrical member 12*a* is at least one blade 12*b*. The cylindrical member 12*a* is driven to rotate about the axis A1 by a motor. The carving head 12 is fixed in place and does not move either vertically or horizontally with respect to the workpiece W. The workpiece W is driven along direction Z by rollers (not shown in this Figure). As the workpiece W moves under the spinning carving head 12, the blade 12*b* produces a straight, uniform cut that does not vary in depth (direction Y) or width (direction X) along the workpiece W.

In a first embodiment, the multi-axis carving head 14 further comprises a substantially cylindrical member 14*a* with an axis A2 substantially parallel to the top surface T of the workpiece W. Affixed to the cylindrical member 14*a* is at least one blade 14*b*. The cylindrical member 14*a* is driven to rotate about axis A2 by a motor. The carving head 14 can be moved either vertically (direction Y) or horizontally (direction X) or both vertically and horizontally simultaneously with respect to the workpiece W. As the workpiece W moves under the spinning carving head 14, the blade 14*b* produces patterns that vary in depth (direction Y), width (direction X) or both along the workpiece W. The multi-axis carving head 14 also has horizontal driving means 14*c* and vertical driving means 14*d*, which move the cylindrical member 14*a* respectively horizontally and vertically with respect to the workpiece W. Horizontal driving means 14*c* and vertical driving means 14*d* have control connections 14*e* to a control system.

The multi-axis carving head 14 may also preferably comprise a tilting assembly 15. The tilting assembly 15 has an axis 15*a* which is substantially along the direction Z (the direction along which the workpiece W is moved). The tilting assembly 15 may rotate about axis 15*a*, as shown by the arrow) in order to tilt the carving head 14 at various angles relative to the top surface T of the workpiece W. Typically, the operator manually tilts the head 14 to the desired angle before beginning the carving operation.

Additionally, the present invention may comprise a bottom carving spindle 16 and side carving spindles 18, also acting on the moving workpiece W.

Figure 2:
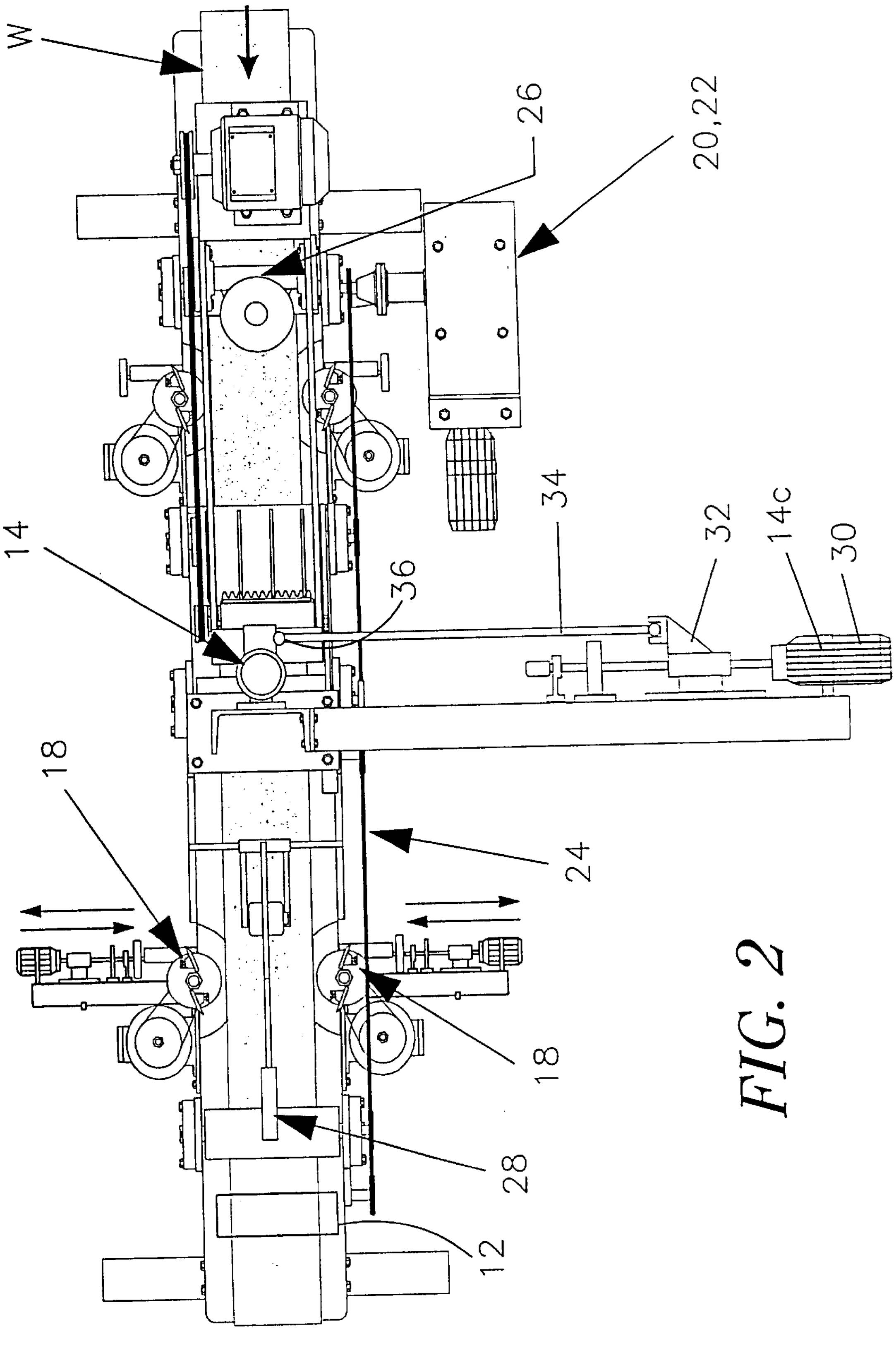
FIG. 2 is a top plan view of the combination machine of the present invention.
Figure 3:
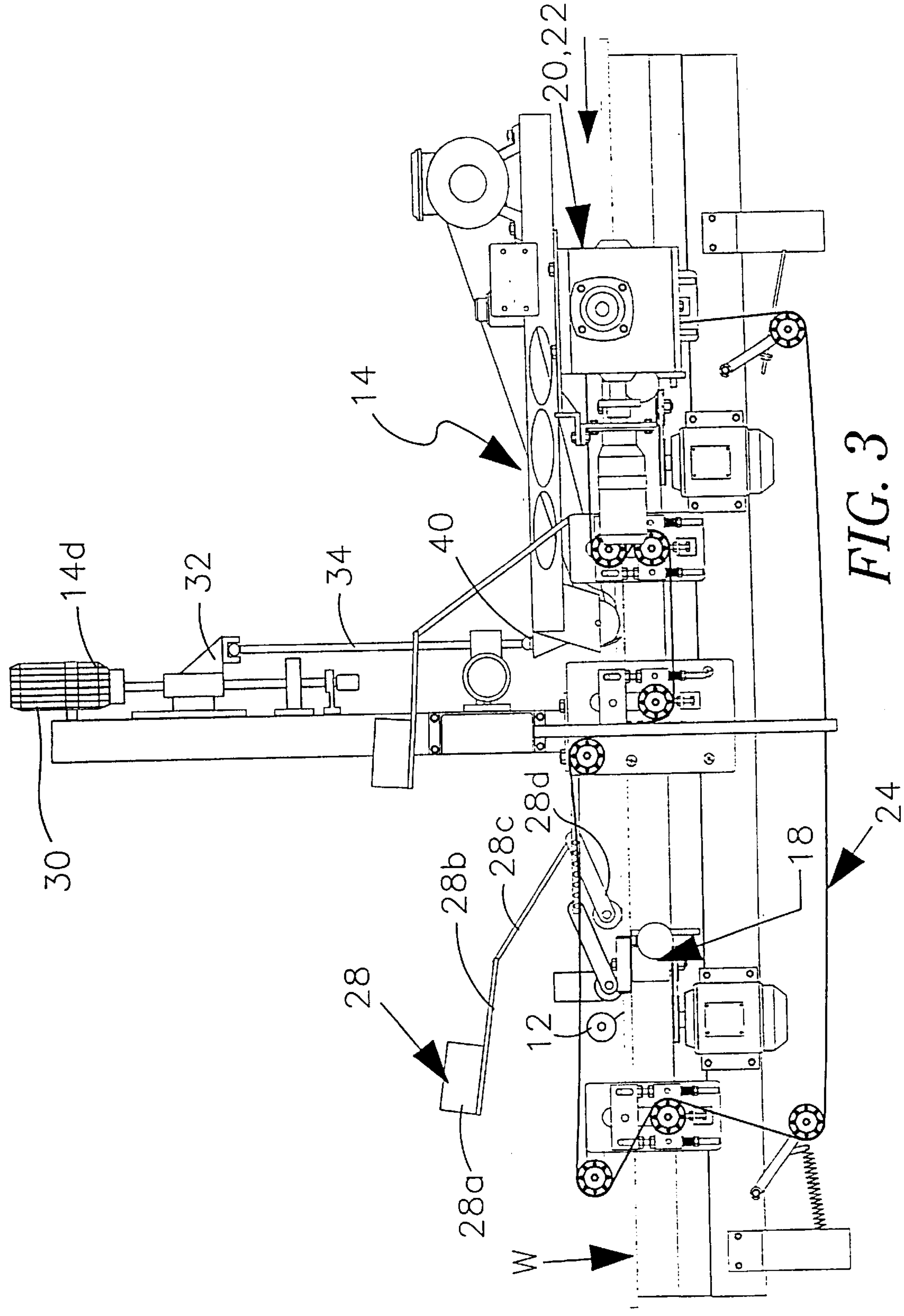
FIG. 3 is a side elevational view of the combination machine of the present invention.
Figure 13B:
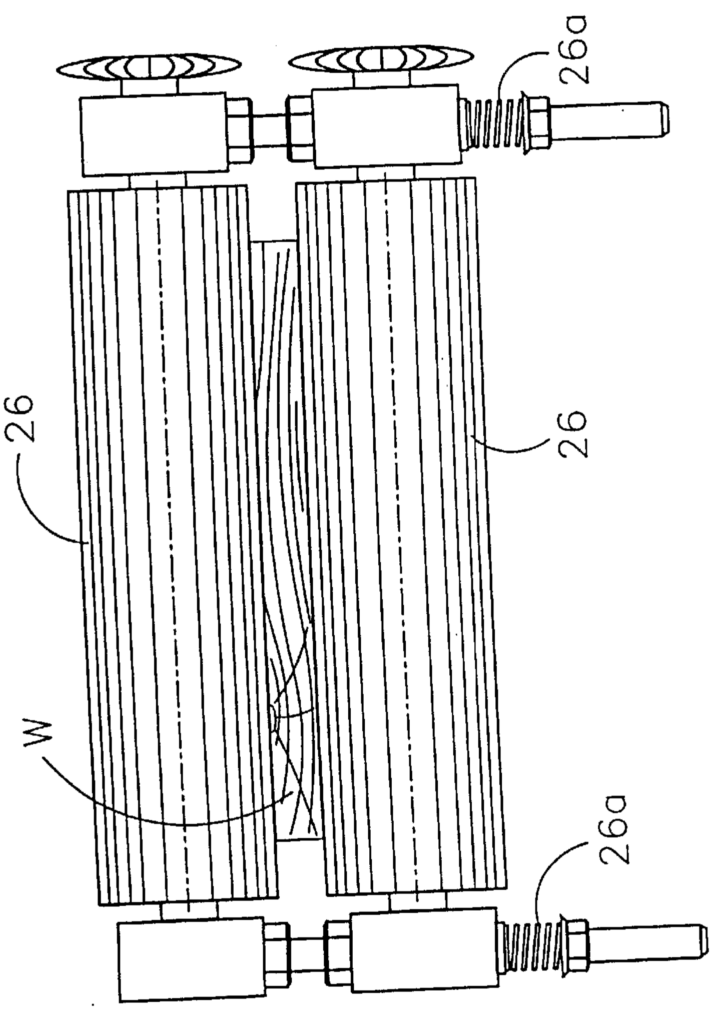
FIG. 13*b* is a front elevational view of the adjustable rollers.
Figure 13A:
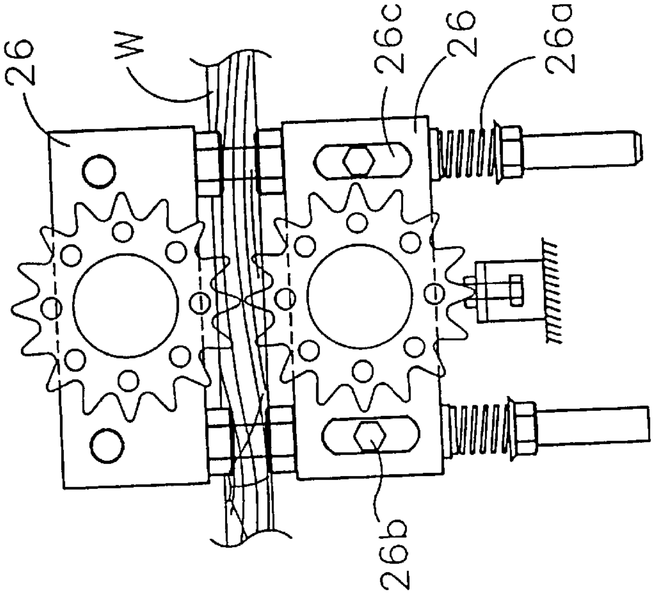
FIG. 13*a* is a side elevational view of adjustable rollers for use in the present invention.

More details of the invention can be seen in FIGS. 2 and 3. A materials driving mechanism 20 such as a motor 22, drive chain 24, and rollers 26, is used to move the workpiece W in the Z direction, as shown by the arrows. The materials driving mechanism may have feed rollers 26 (shown in FIG. 13) that produce a steady force against the workpiece even if the workpiece has variable thickness. Springs 26*a* hold the rollers 26 against the workpiece W. The rollers are adjustable for material thickness by the use of adjustment slots 26*b* and bolts 26*c*. A hold-down mechanism 28 keeps the workpiece from moving in the vertical (Y) direction. The hold-down mechanism 28 may be self-adjusting to hold the workpiece down for continuous accurate carving. For example, the hold-down mechanism 28 may include a weight plate 28*a*, arm 28*b*, adjustable pivot shaft 28*c*, and hold-down roller 28*d*.

Figure 4:
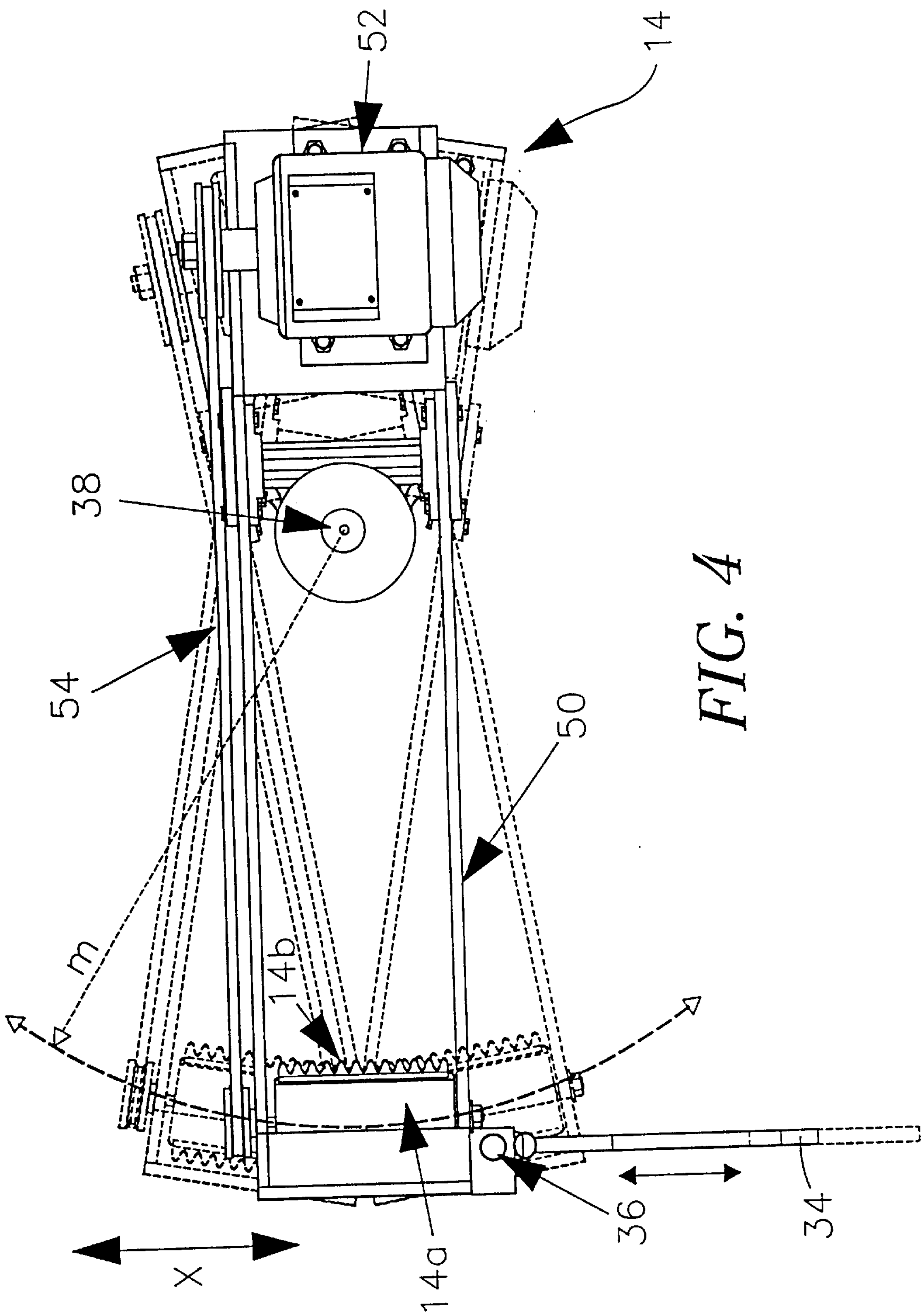
FIG. 4 is a top plan view of the multi-axis carving machine of the present invention.

Turning to FIG. 2, details of the horizontal driving means 14*c* may be appreciated. The horizontal driving means may be any appropriate mechanism for moving the carving head 14 in the horizontal (X) direction. Suitably, the horizontal driving means 14*c* may further comprise a motor 30, ball gear 32, and ball joint connecting rod 34. As the motor 30 is energized by the control system, the motor drives ball gear 32, which in turn drives the connecting rod 34 toward or away from the workpiece W. The connecting rod 34 engages the cutting head 14 at a first ball joint 36. As best seen in FIG. 4, this produces rotation about a first pivot point 38 (which may be a ball joint), so that the cutter 14*a* moves in an arc with radius m (shown by dotted lines) along the direction X.

Figure 5:
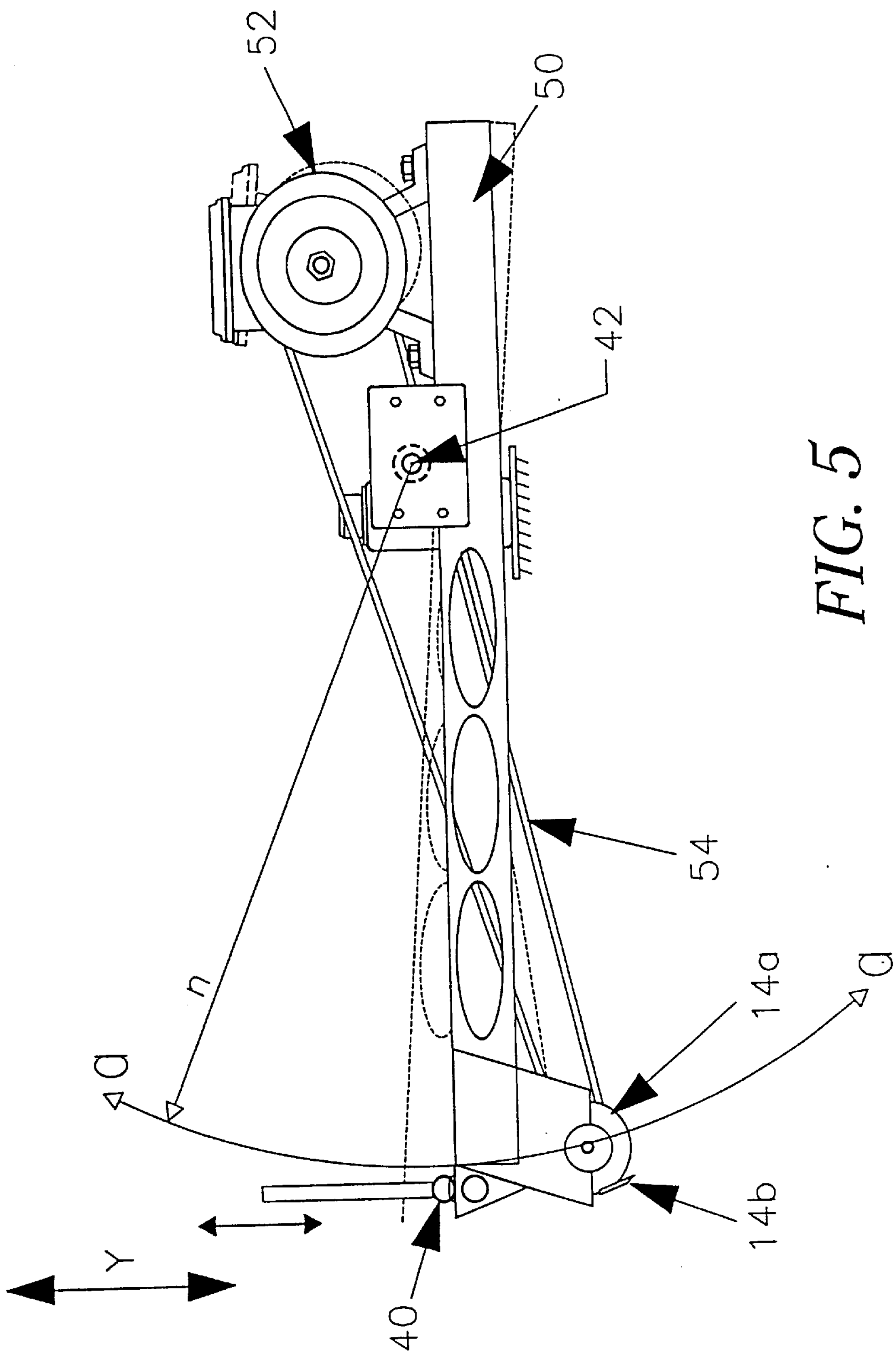
FIG. 5 is a side elevational view of the multi-axis carving machine of the present invention.

Turning to FIG. 3, details of the vertical driving means 14*d* may be appreciated. The vertical driving means may be any appropriate mechanism for moving the carving head 14 in the vertical (Y) direction. Suitably, the vertical driving means 14d may further comprise a motor 30, ball gear 32, and ball joint connecting rod 34. As the motor 30 is energized by the control system, the motor drives ball gear 32, which in turn drives the connecting rod 34 toward or away from the workpiece W. The connecting rod 34 engages the cutting head 14 at a second ball joint 40. As best seen in FIG. 5, this produces rotation about a second pivot point 42 (which may be a ball joint), so that the cutter 14*a* moves in an arc a with radius n (shown by dotted lines) along the direction Y.

Details of the multi-axial cutter 14 may also be appreciated from FIGS. 4 and 5. The multi-axial cutter 14 further comprises a chassis 50 pivoting about the second pivot point 42. A motor 52 is mounted on the chassis 50 and drives the cutter head 14*a* by a belt 54 or other suitable mechanism.

Figure 6:
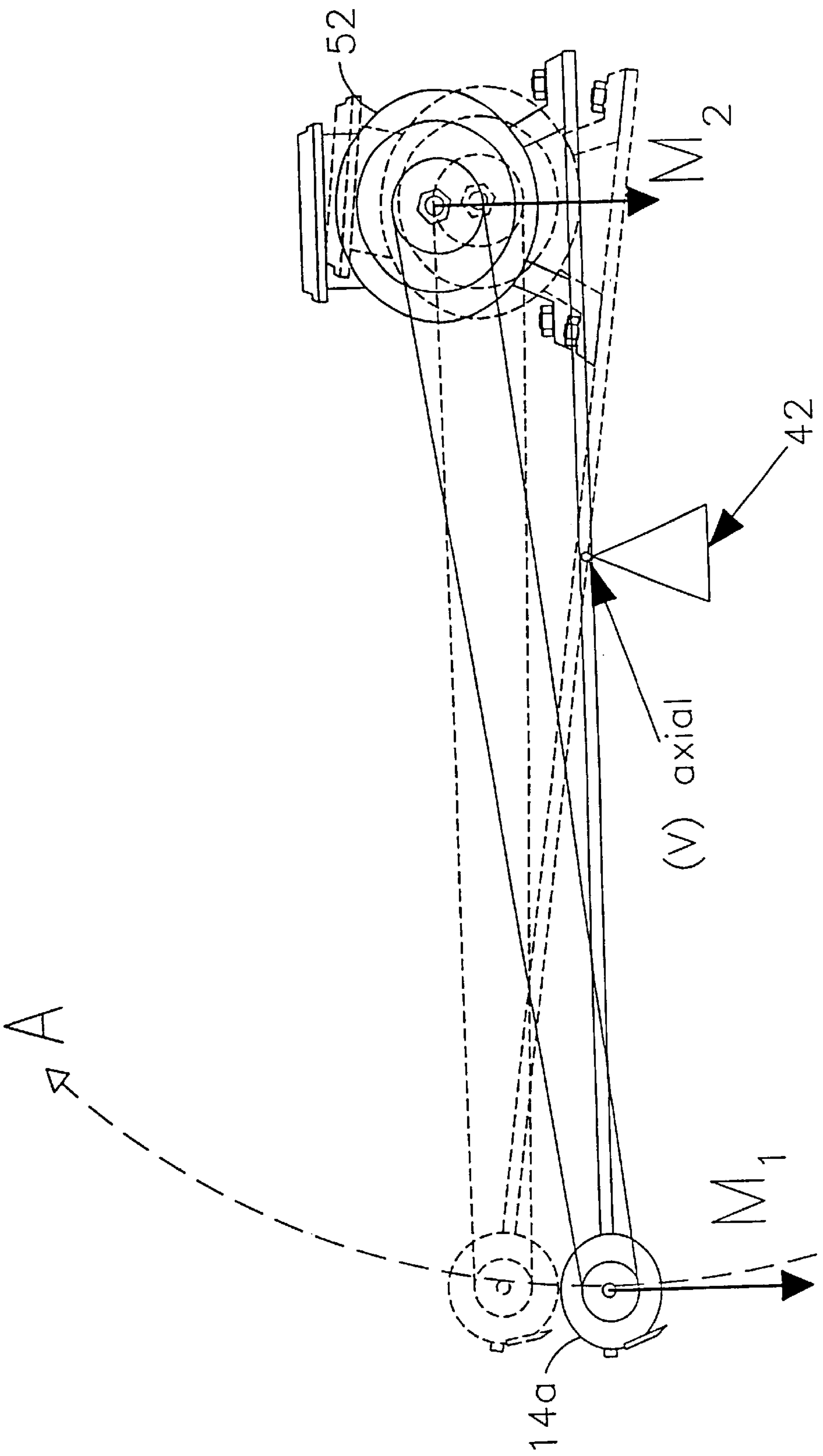
FIG. 6 is a schematic side elevational view of the multi-axis carving machine of the present invention.
Figure 7B:
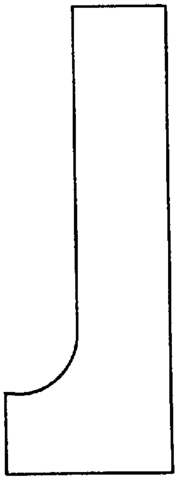
FIG. 7*e* is a schematic view of a workpiece with edges shaped by one of the blades of FIGS. *7a–7d*.
Figure 7E:
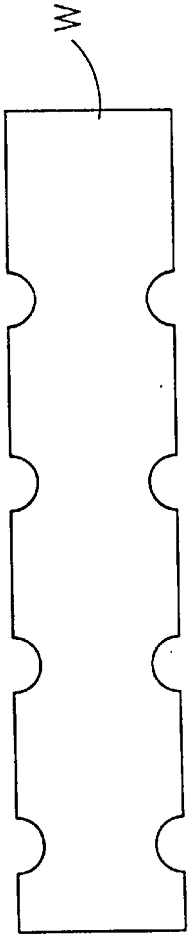
Figure 7A:
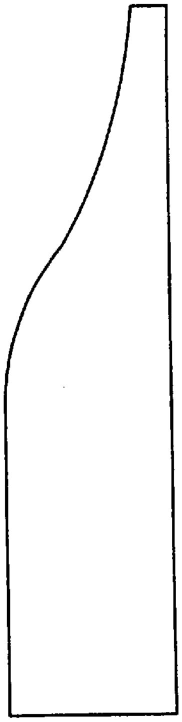
Figure 7C:
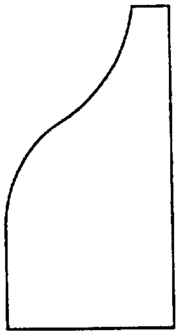
Figure 7D:
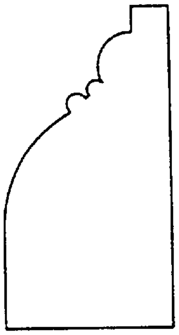

FIG. 6 shows that for optimal operation, the moment M1 between the cutter 14*a* and the second pivot point 42 should equal the moment M2 between the second pivot point 42 and the motor 52, so that there is little force exerted by the cutter 14*a* against the workpiece W.

FIG. 7 shows that a variety of blades (FIGS. 7*a*–7*d*) may be attached to the side cutters 18. FIG. 7*e* shows a scalloped pattern that may be produced in a workpiece W by the use of one of the blades.

Figure 8:
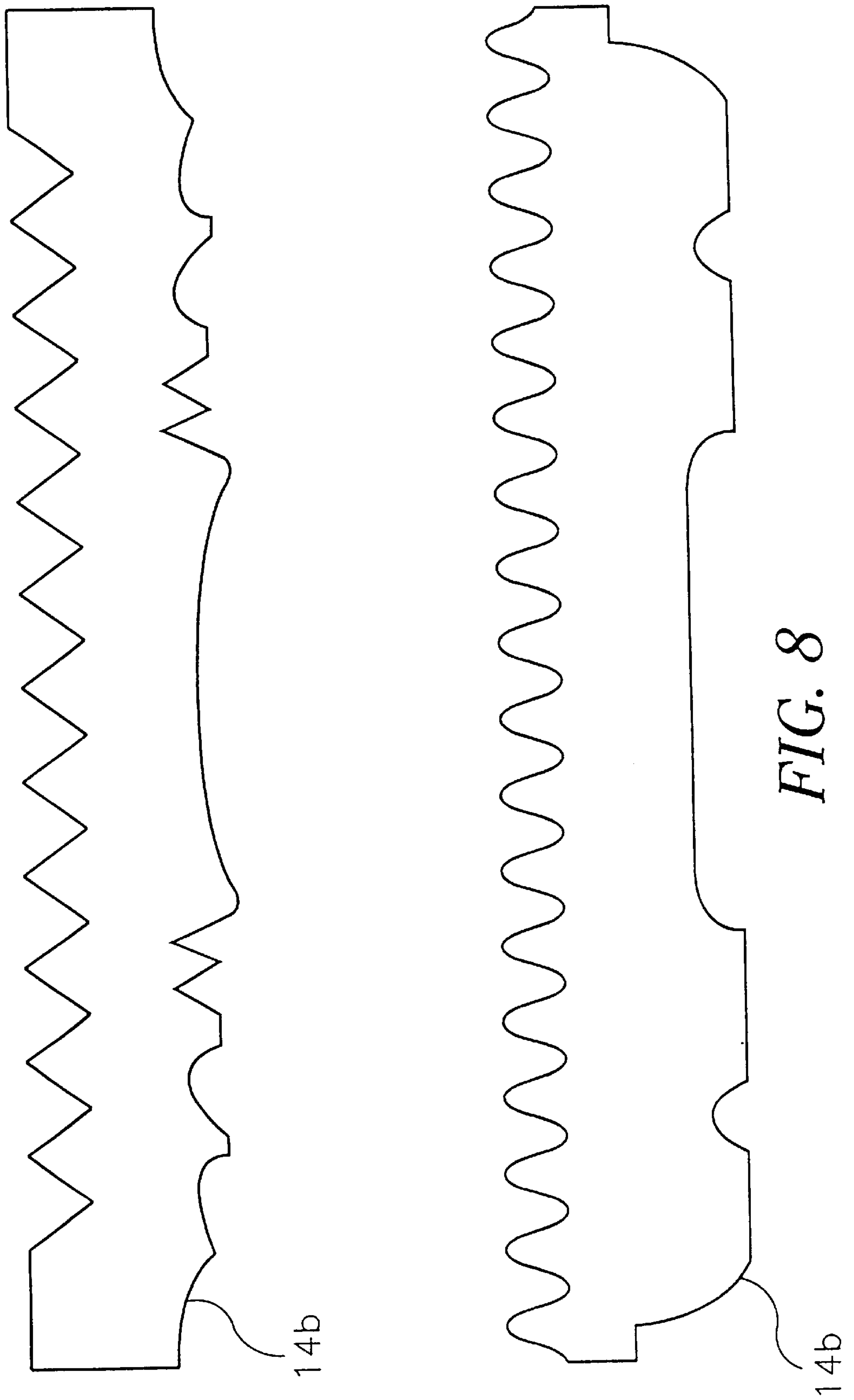
FIG. 8 shows two samples of blades for use with the multi-axial carving machine of the present invention.

FIG. 8 shows examples of blades 14*b* that may be attached to the cutter 14*a* of the multi-axis cutter 14. The type of cut produced will vary depending upon the blade configuration.

Figure 9:
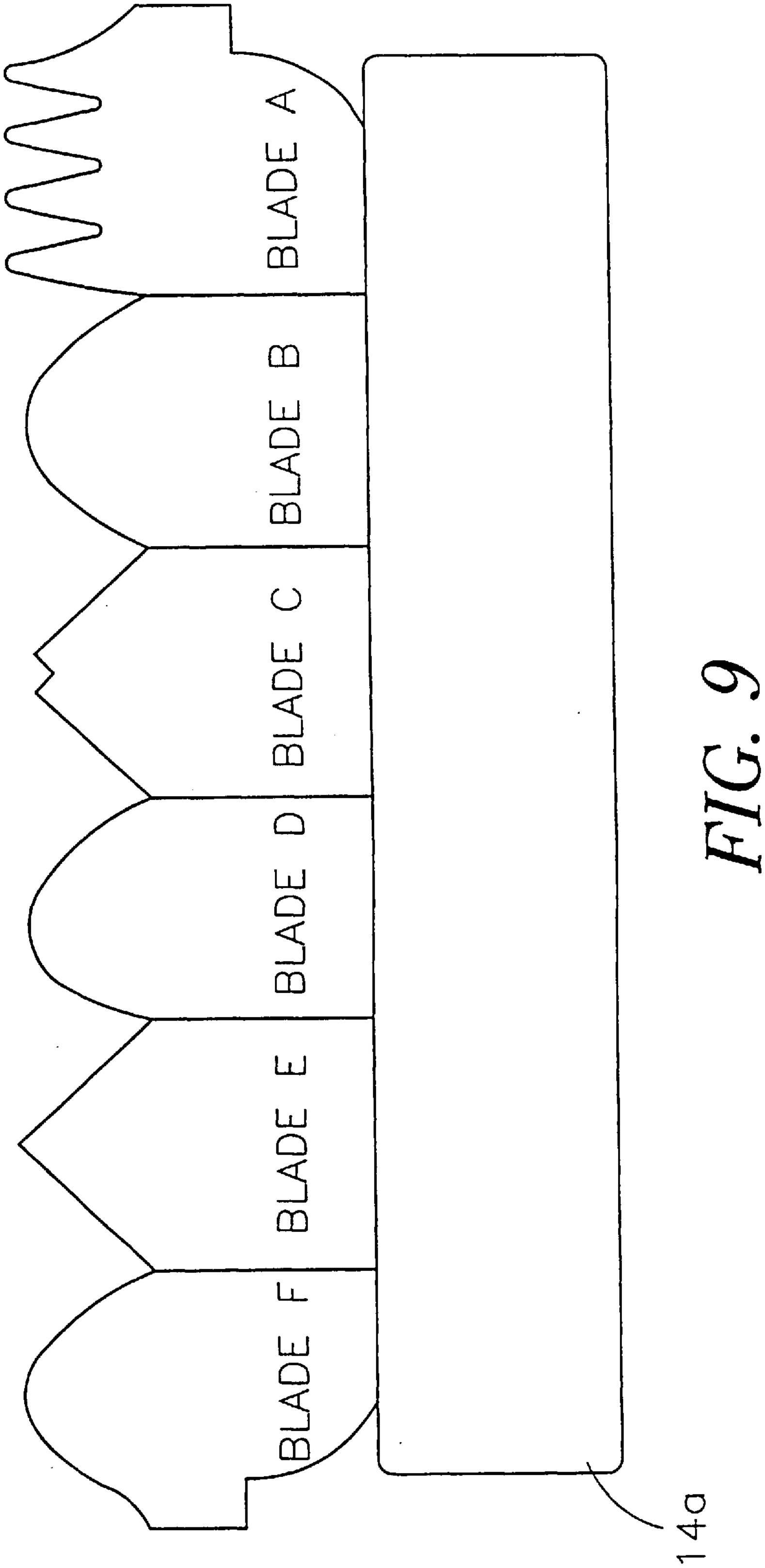
FIG. 9 shows a blade holding mechanism with changeable carving blades for use with the multi-axial carving machine of the present invention.

FIG. 9 shows that several blades A–F may be attached to the cutter 14*a* in any combination to produce varying cuts.

Figure 10:
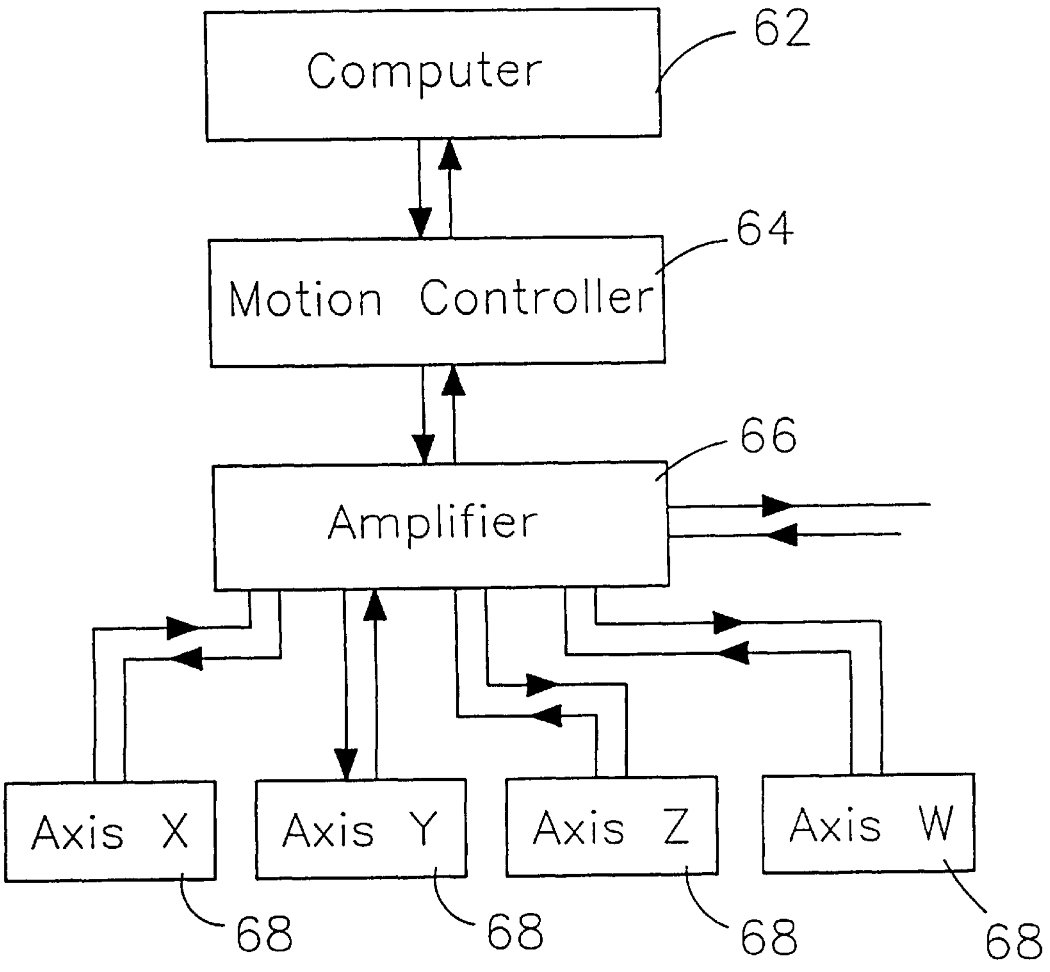
FIG. 10 is a block diagram of a control system for use with the combination machine of the present invention.

FIG. 10 illustrates schematically a control system 60 for the invention, consisting of a computer 62, motion controller 64, amplifier 66, and actuators 68. The machine 10 is guided by the computer 62 through the motion controller 64 and work in automatic as well as manual mode. A working program developed on the computer 62 with 3-D graphics may be downloaded to the motion controller 64, which drives the three actuators 68 and receives back signals from encoders and sensors. The motion controller 64 may perform checking of end point sensors, zero sensors, and an emergency stop button. In case of an emergency, the controller 64 can stop all motion and send a signal to the computer 62. According to the program, the controller 64 can turn on and off the various motors and verify the on/off status.

The control system may work in two motion modes. In a master/slave mode, the movement of the workpiece W is used as a master and the motions in various axes are slaved, resulting in a surface that depends on the coordinates along the workpiece. In the second mode, each axis of motion can work independently and the surface can vary from point to point.

The computer program may work in two modes: manual or automatic. In manual mode, the operator can adjust the machine, modify its speed, modify intervals of axial motion, and save parameters in a library or change these parameters. In automatic mode, the program works with parameters chosen from the library.

Figure 11:
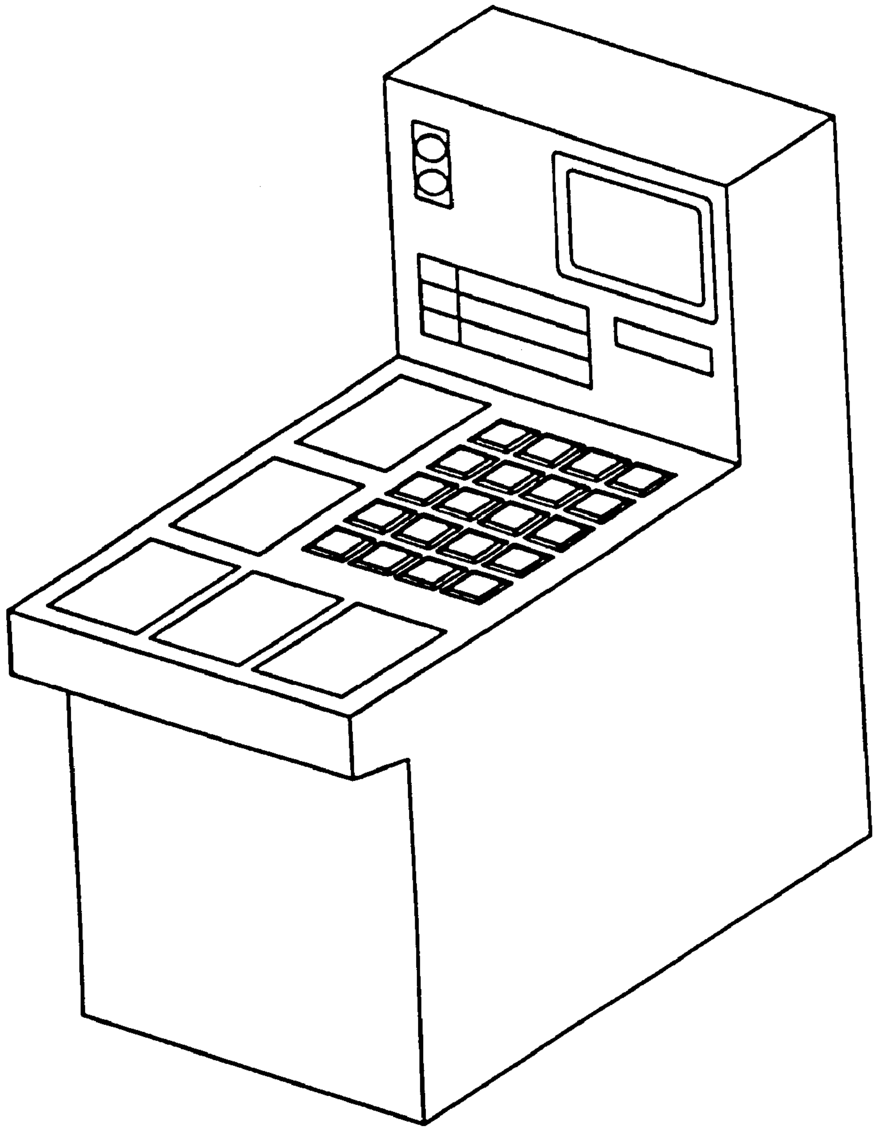
FIG. 11 is a schematic of a computer implementing the control system shown in FIG. 10.

FIG. 11 illustrates schematically a computer on which the control system 60 may be implemented.

Figure 12:
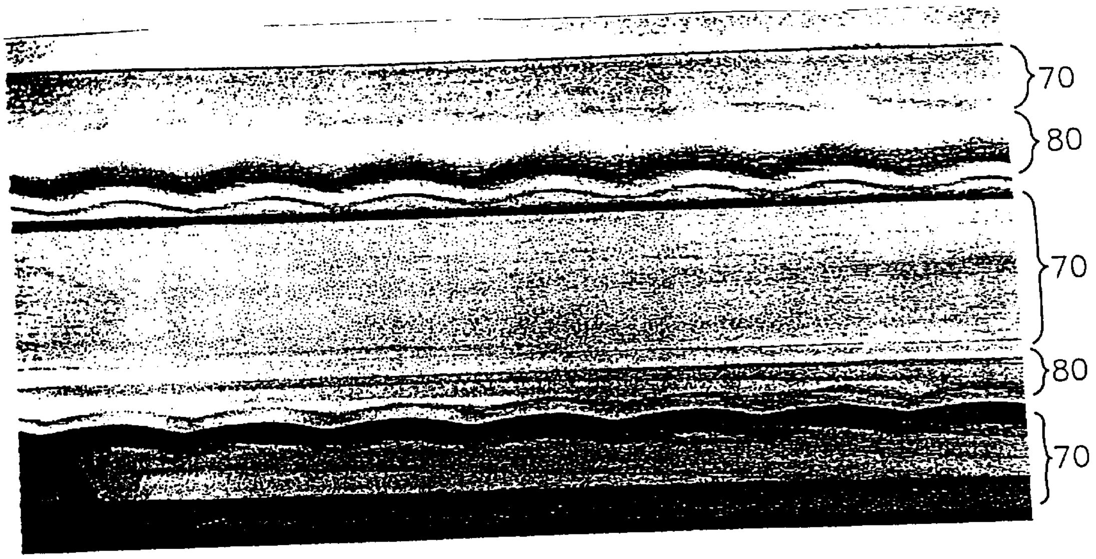
FIG. 12 shows samples of workpieces carved by the combination machine of the present invention.

FIG. 12 illustrates the types of carvings that may be produced by the machine 10. The portions 70 of the workpiece W are carved by the traditional carving head 12, while the portions 80 are simultaneously carved by the multi-axis carving head 14.

Figure 14:
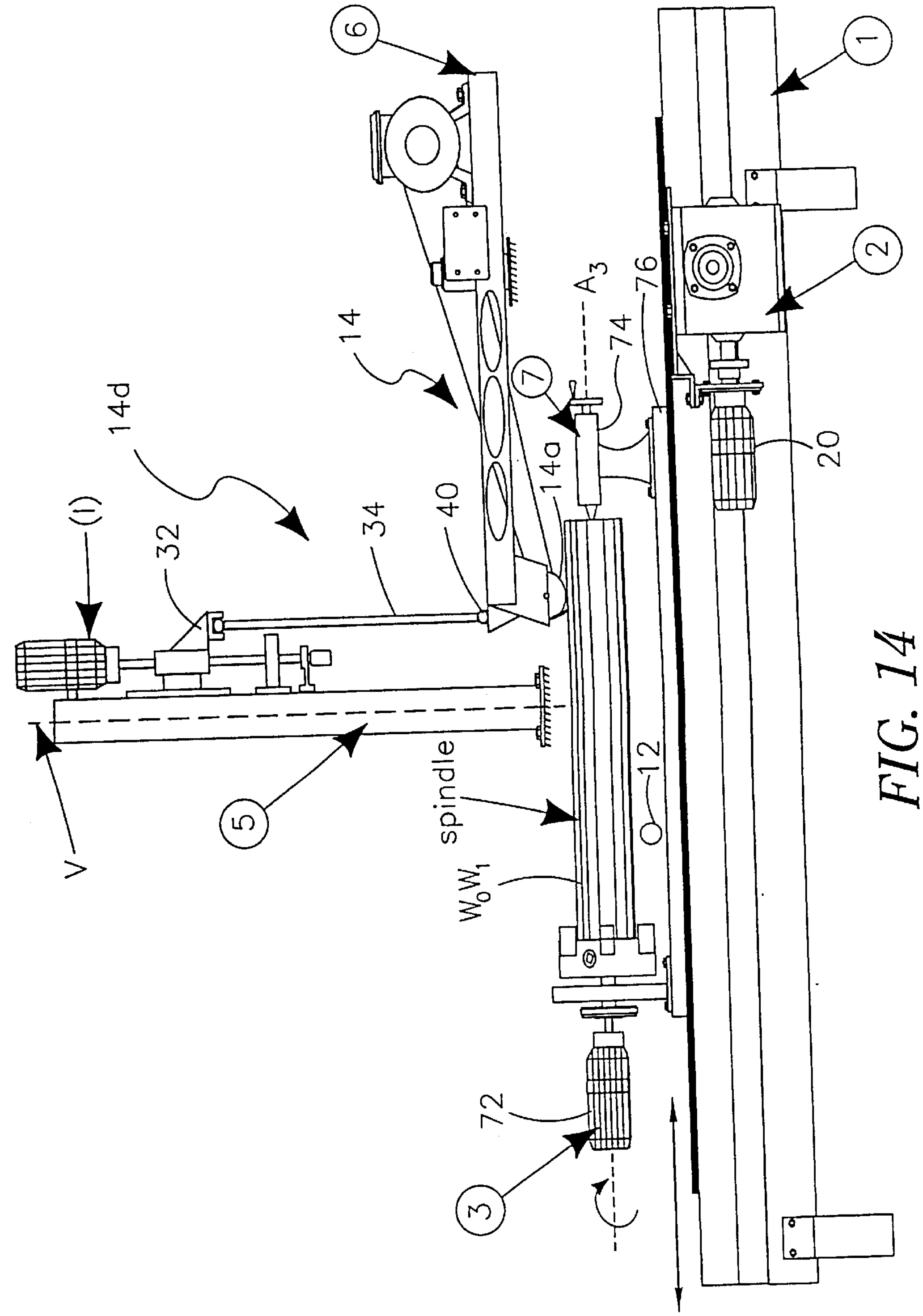
FIG. 14 is a side elevational view of a second embodiment of the multi-axis carving machine of the present invention for carving spindle carving.
Figure 15:
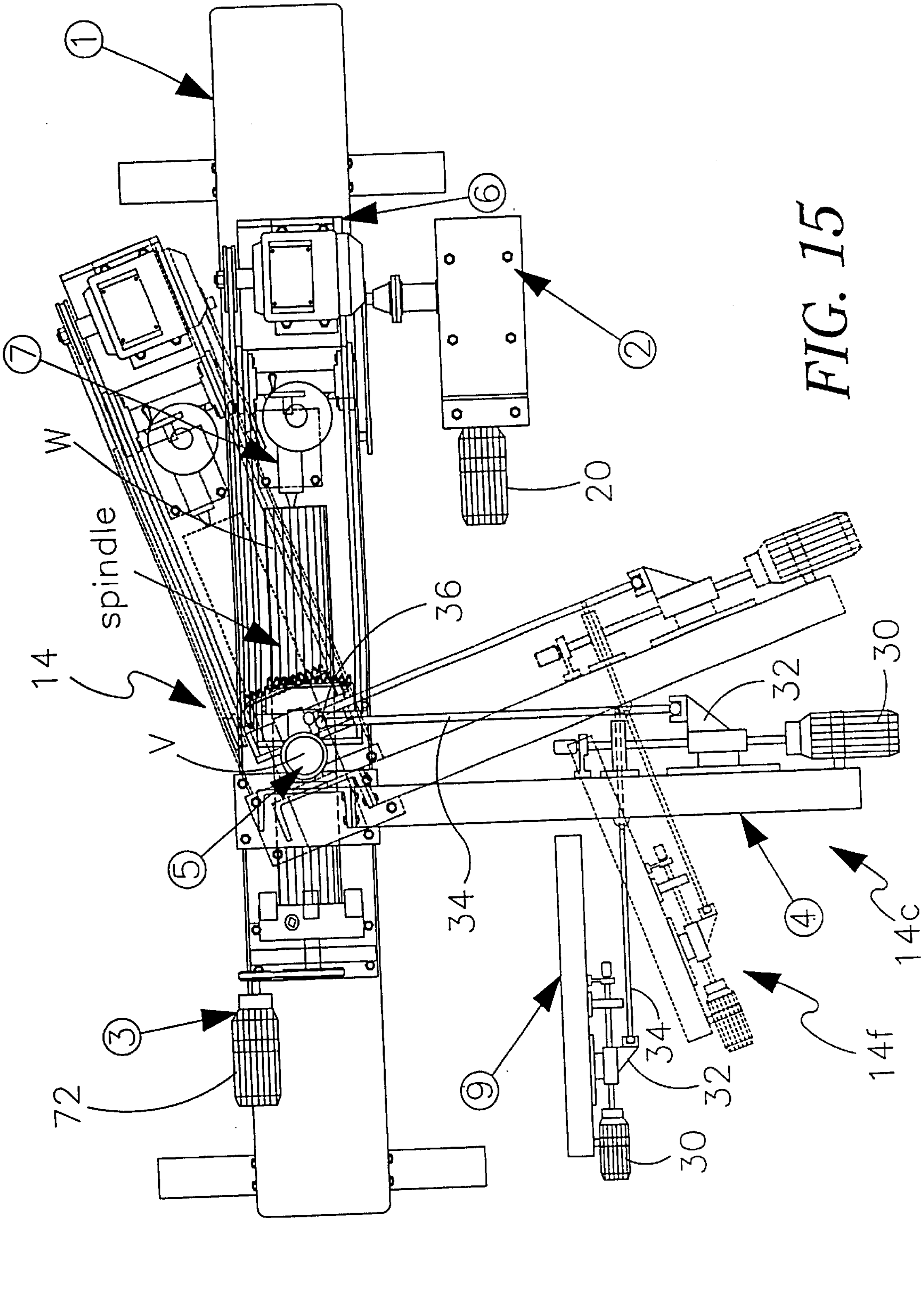
FIG. 15 is a top plan view of a second embodiment of the multi-axis carving machine of the present invention for carving spindle carving.
Figure 16:
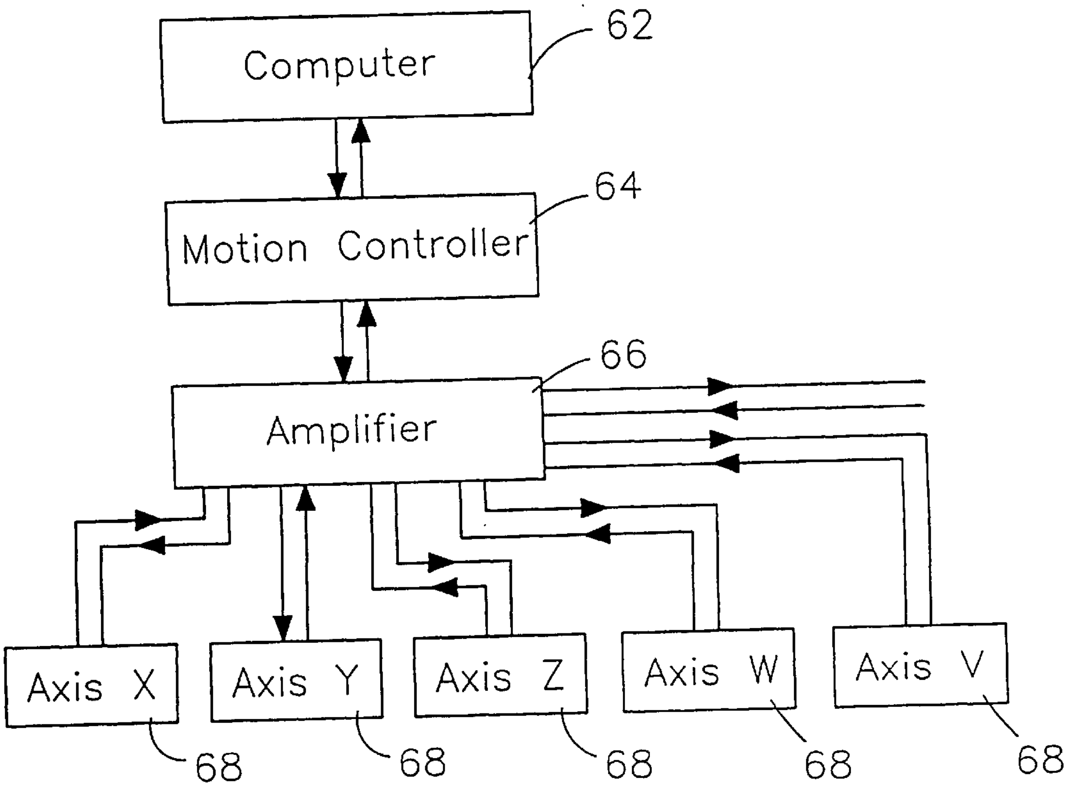
FIG. 16 is a block diagram of a control system for use with the second embodiment of the present invention for spindle carving.

A second embodiment of the apparatus of the present invention is shown in FIGS. 14–16.

Figure 14A:
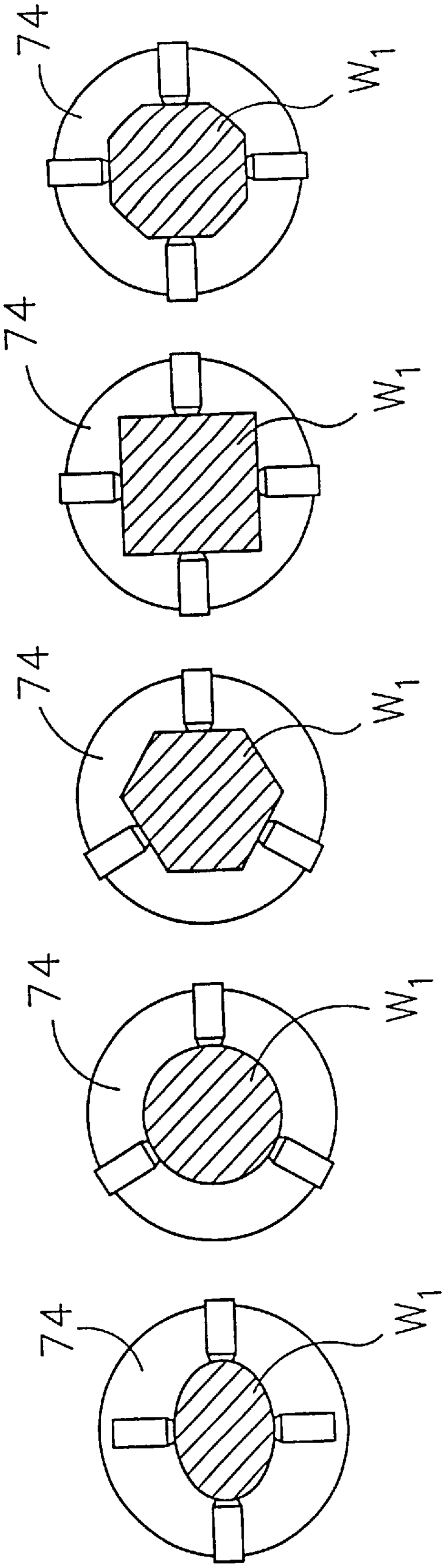
FIG. 14*a* shows various cross-sections of spindles that may be carved with the second embodiment.

The second embodiment is similar to the first embodiment, except the workpiece W is a spindle $W_1$ which is rotated about an axis $A_3$ by a motor 72. The spindle is centered and held in place by centering and holding mechanism 74. The motor, spindle, and centering and holding mechanism are mounted on a movable plate 76, which is moved along the direction Z by materials driving mechanism 20, as shown by the arrow in FIG. 14. FIG. 14*a* shows various spindle cross-sections which may be used with this embodiment.

As in the first embodiment, the second embodiment may be moved in the direction X by the horizontal driving means 14*c* and in the direction Y by the vertical driving means 14*d*.

In addition, the second embodiment may pivot about a vertical axis V, as shown by the phantom lines in FIG. 15. To accomplish this result, the apparatus 10 further comprises a V-axis driving means 14*f*, which may comprise a motor 30, ball gear 32, and ball joint connecting rod 34.

As shown in FIG. 16, the control system 60 is modified by adding an additional actuator to control motion about the V-axis.

Figure 17:
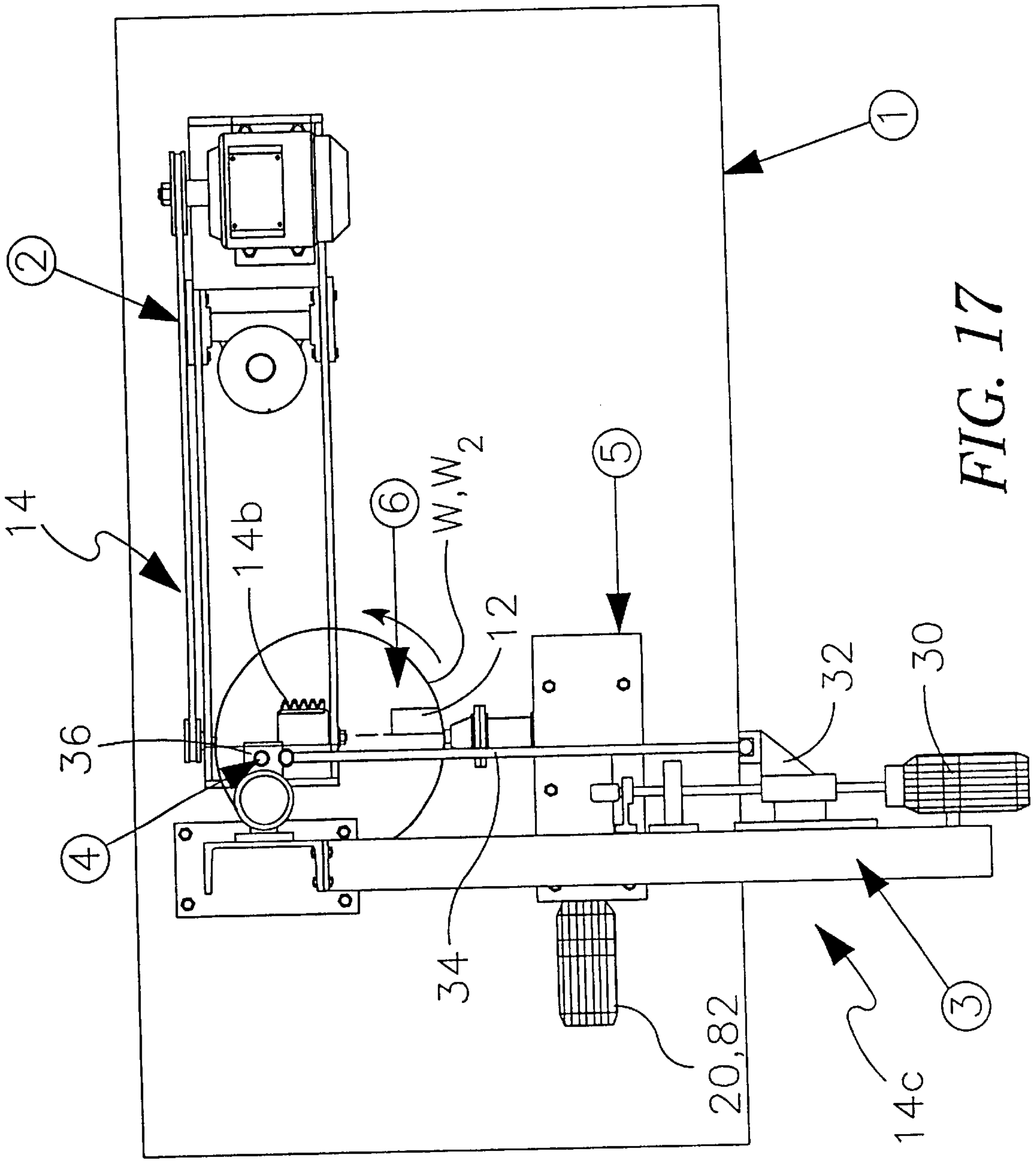
FIG. 17 is a top plan view of a third embodiment of the multi-axis carving machine of the present invention for circular carving.
Figure 18:
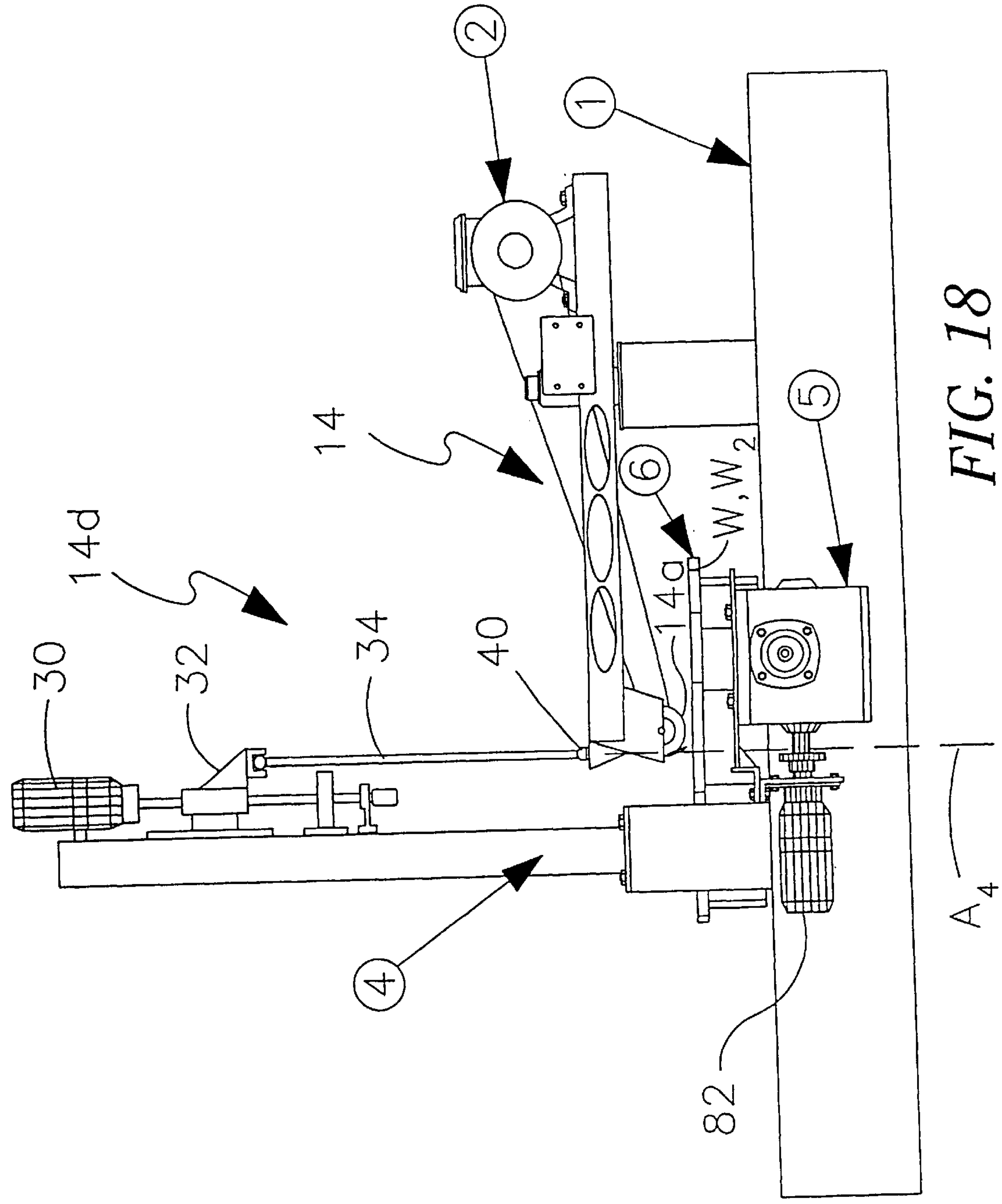
FIG. 18 is a side elevational view of a third embodiment of the multi-axis carving machine of the present invention for circular carving.

A third embodiment of the apparatus of the present invention is shown in FIGS. 17–18.

The third embodiment is similar to the first embodiment, except the workpiece W is a flat disk $W_2$ which is rotated about an axis $A_4$ by a materials driving mechanism 20, which is a motor 82, as shown by the arrow in FIG. 17.

As in the first embodiment, in the third embodiment the head 14 may be moved in the direction X by the horizontal driving means 14*c* and in the direction Y by the vertical driving means 14*d*.

Simultaneously, the traditional carving head 12 may produce straight, uniform cuts as previously described.

Figure 19:
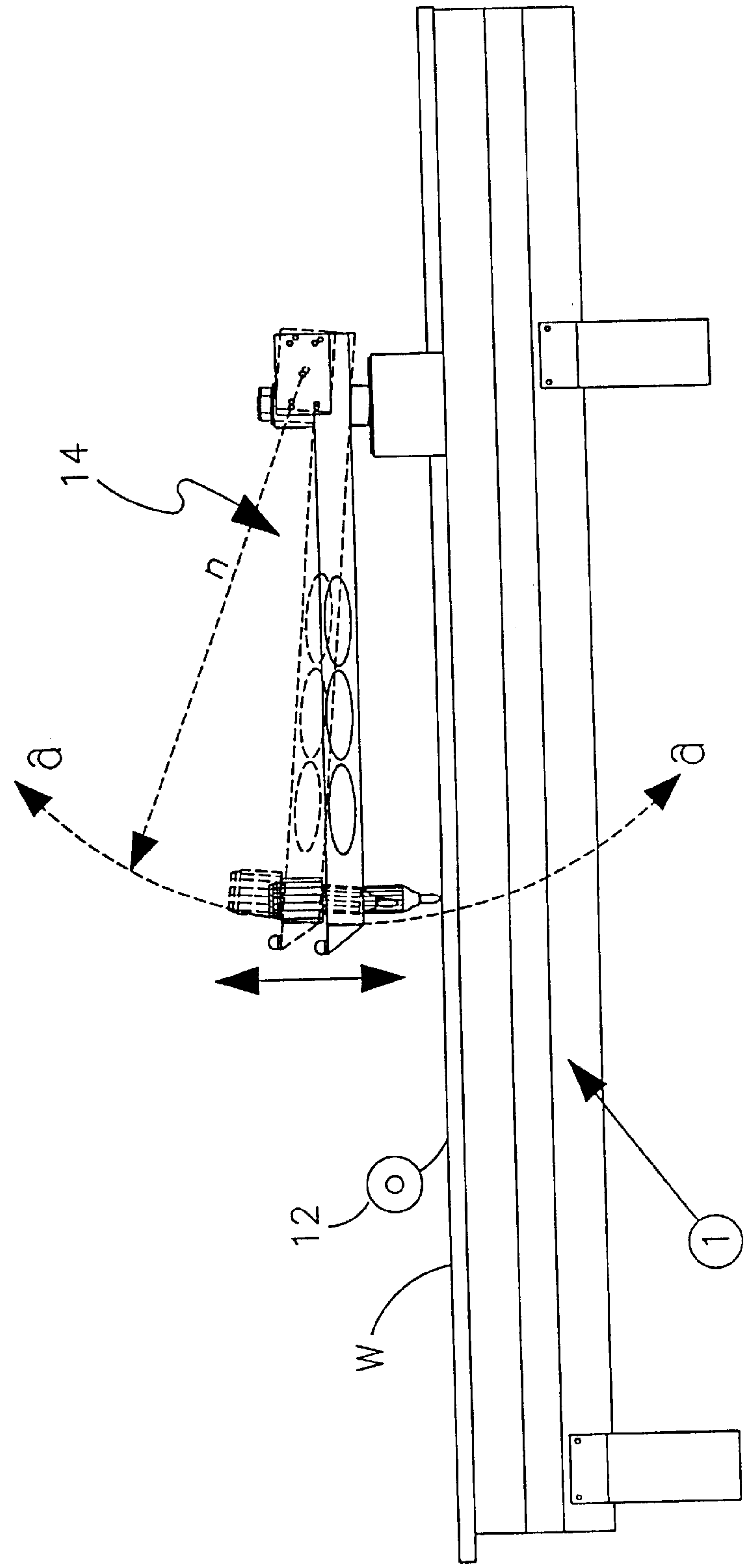
FIG. 19 is a schematic side elevational view of a fourth embodiment of the multi-axis carving machine of the present invention for picture carving.
Figure 20:
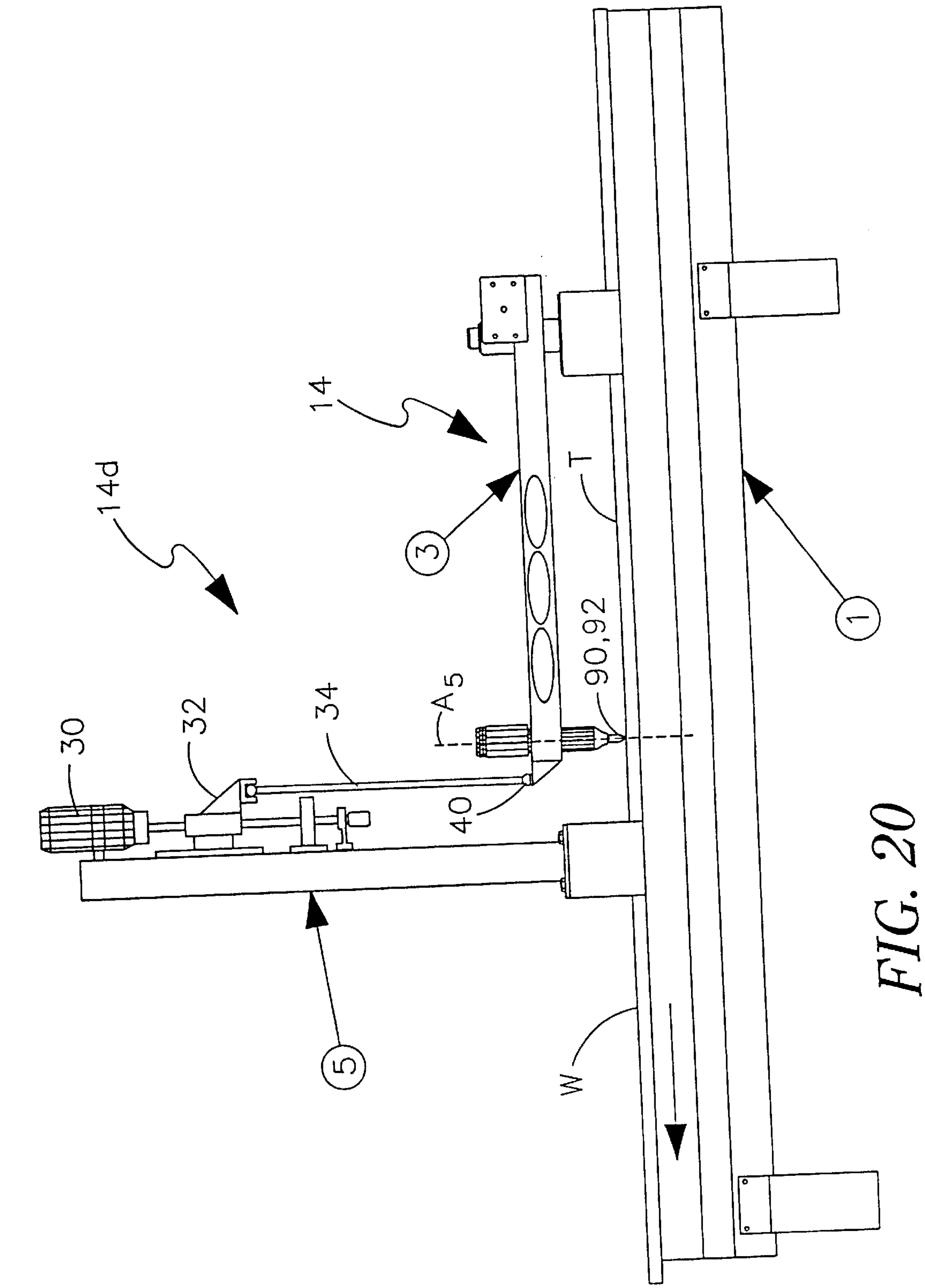
FIG. 20 is a side elevational view of a fourth embodiment of the multi-axis carving machine of the present invention for picture carving.
Figure 21:
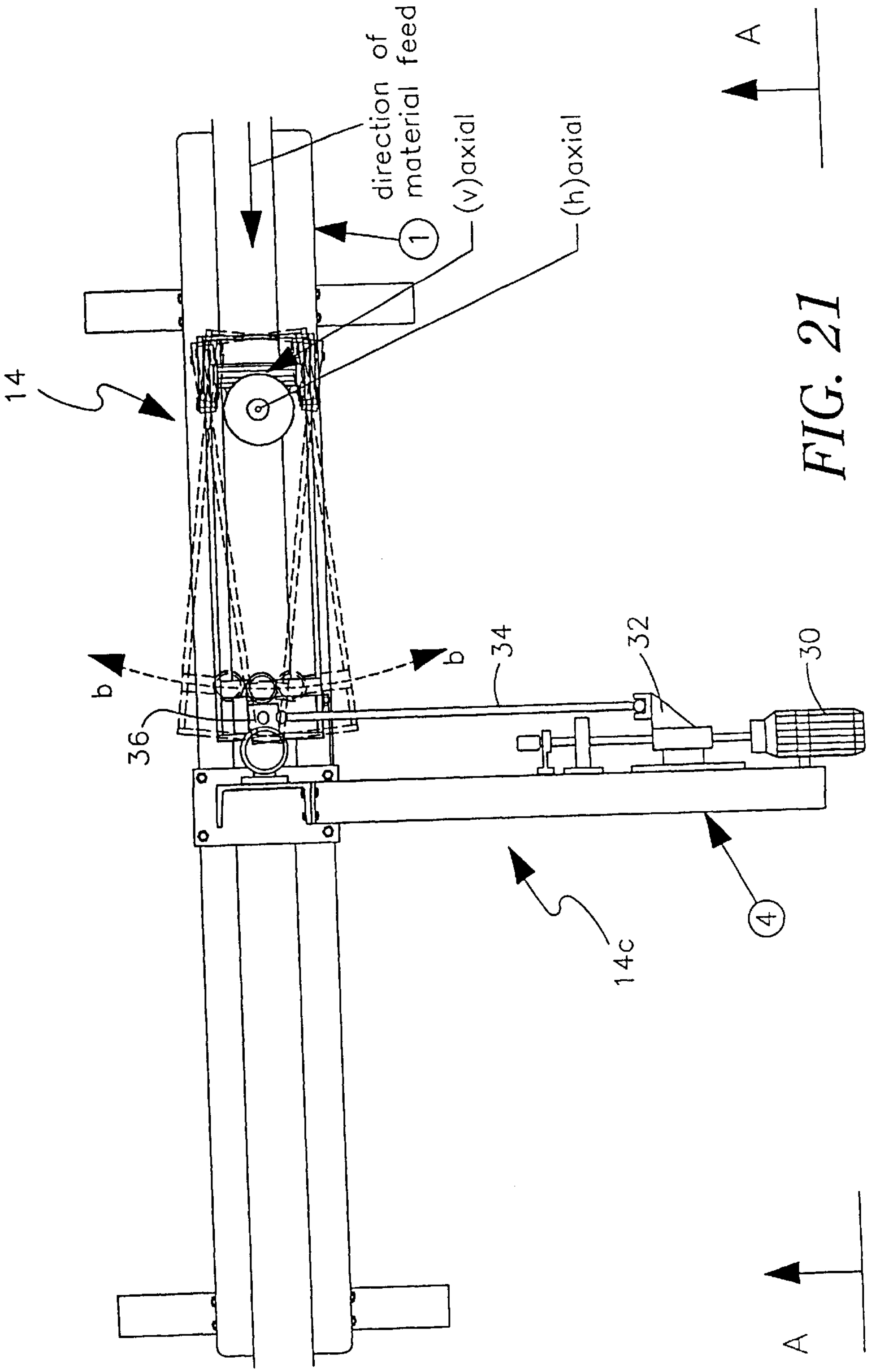
FIG. 21 is a top plan view of a fourth embodiment of the multi-axis carving machine of the present invention for picture carving.

A fourth embodiment of the apparatus of the present invention is shown in FIGS. 19–21.

In the fourth embodiment, the multi-axis carving head 14 is modified to be a member 90 having an axis $A_5$ that is substantially perpendicular to the top surface T of the workpiece W. Preferably, the member 90 is a router 92. However, another tool such as a laser burning head could also be used.

Substantially in the same way as the first embodiment, in the fourth embodiment the head 14 may be moved in the direction X by the horizontal driving means 14*c* (FIG. 21) and in the direction Y by the vertical driving means 14*d* (FIG. 20)

As the workpiece W is moved in the direction Z, as shown by the arrow, motion of the head 14 causes the router to carve the workpiece W. This may be used to produce pictures in the top surface T of the workpiece W.

Simultaneously, the traditional carving head 12 may produce straight, uniform cuts as previously described.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. Apparatus for carving a workpiece to simultaneously produce a uniformly carved portion and a variably carved portion, the apparatus comprising:

(a) a single-axis carving head;

(b) a multi-axis carving head.

2. The apparatus of claim 1, wherein the single-axis carving head further comprises a rotating substantially cylindrical member having an axis substantially parallel to a surface of the workpiece and a blade affixed to the substantially cylindrical member, and wherein the single-axis carving head is fixed relative to the workpiece.

3. The apparatus of claim 1, wherein the multi-axis carving head is movable substantially parallel to and substantially perpendicular to a surface of the workpiece.

4. The apparatus of claim 3, wherein the multi-axis carving head further comprises a rotating substantially cylindrical member having an axis substantially parallel to a surface of the workpiece and a blade affixed to the substantially cylindrical member.

5. The apparatus of claim 3, wherein the multi-axis carving head further comprises a member having an axis substantially perpendicular to a surface of the workpiece.

6. The apparatus of claim 5, wherein the multi-axis carving head further comprises a router.

7. The apparatus of claim 5, the multi-axis carving head further comprising a horizontal driving means and a vertical driving means.

8. The apparatus of claim 1, further comprising at least one side carving head.

9. The apparatus of claim 8, further comprising at least one bottom carving head.

10. The apparatus of claim 1, further comprising a materials driving mechanism adapted to move the workpiece past the single-axis carving head and the multi-axis carving head.

11. The apparatus of claim 1, further comprising a control system adapted to move the multi-axis carving head simultaneously in two dimensions.

12. The apparatus of claim 1, wherein the control system further comprises a programmable computer.

13. The apparatus of claim 1, further comprising a hold-down mechanism adapted to prevent the workpiece from moving relative to the single-axis carving head and the multi-axis carving head.

14. The apparatus of claim 8, further comprising at least one removable blade attachable to the side carving head.

15. The apparatus of claim 1, further comprising at least one removable blade attachable to the multi-axis carving head.

16. The apparatus of claim 4, wherein the multi-axis carving head may be tilted at an angle to a surface of the workpiece.

17. The apparatus of claim 4, wherein the multi-axis carving head may be adjusted to an angle to the direction of motion of the workpiece.

18. Apparatus for carving a flat workpiece to simultaneously produce a uniformly carved portion and a variably carved portion, the apparatus comprising:

(a) a single-axis carving head;

(b) a multi-axis carving head; and (c) a control system adapted to control movement of the multi-axis carving head simultaneously in two dimensions.

19. The apparatus of claim 18, the single-axis carving head further comprises a rotating substantially cylindrical member having an axis substantially parallel to a surface of the workpiece and a blade affixed to the substantially cylindrical member, and wherein the single-axis carving head is fixed relative to the workpiece.

20. The apparatus of claim 18, wherein the multi-axis carving head is movable substantially parallel to and substantially perpendicular to a surface of the workpiece.

21. The apparatus of claim 20, wherein the multi-axis carving head further comprises a rotating substantially cylindrical member having an axis substantially parallel to a surface of the workpiece and a blade affixed to the substantially cylindrical member.

22. The apparatus of claim 20, wherein the multi-axis carving head further comprises a member having an axis substantially perpendicular to a surface of the workpiece.

23. The apparatus of claim 21, wherein the multi-axis carving head further comprises a router.

24. The apparatus of claim 18, the multi-axis carving head further comprising a horizontal driving means and a vertical driving means.

25. The apparatus of claim 24, further comprising at least one side carving head.

26. The apparatus of claim 18, further comprising at least one bottom carving head.

27. The apparatus of claim 18, further comprising a materials driving mechanism adapted to move the workpiece past the single-axis carving head and the multi-axis carving head.

28. The apparatus of claim 18, wherein the multi-axis carving head may be tilted at an angle to a surface of the workpiece.

29. The apparatus of claim 18, wherein the multi-axis carving head may be adjusted to an angle to the direction of motion of the workpiece.

30. A method for carving a uniformly carved portion and a multi-axis carved portion in a workpiece in a single pass, comprising the steps of:

(a) moving the workpiece in a first direction while (b) moving a multi-axis carving head simultaneously in two dimensions substantially perpendicular to the first direction and then (c) carving a uniformly carved portion into the workpiece using a fixed cutting head.

* * * * *